(12) United States Patent
Held (10) Patent No.: US 10,457,126 B2
(45) Date of Patent: Oct. 29, 2019

(54) OPEN-AIR CAR CANOPY AND COVER ASSEMBLY AND METHOD OF OPERATION

(71) Applicant: Michael P. Held, West Seneca, NY (US)

(72) Inventor: Michael P. Held, West Seneca, NY (US)

(*) Notice: Subject to any disclaimer, the term of this patent is extended or adjusted under 35 U.S.C. 154(b) by 0 days.

(21) Appl. No.: 15/975,899

(22) Filed: May 10, 2018

(65) Prior Publication Data

US 2018/0326824 A1 Nov. 15, 2018

Related U.S. Application Data

(60) Provisional application No. 62/505,306, filed on May 12, 2017.

(51) Int. Cl.
*B60J 7/10* (2006.01)
*A63B 55/60* (2015.01)
*B60J 7/12* (2006.01)

(52) U.S. Cl.
CPC ............ *B60J 7/102* (2013.01); *B60J 7/10* (2013.01); *A63B 55/61* (2015.10); *B60J 7/1278* (2013.01)

(58) Field of Classification Search
CPC ............ B60J 7/102; B60J 7/10; B60J 7/1278
USPC .................................................. 296/100.14
See application file for complete search history.

(56) References Cited

U.S. PATENT DOCUMENTS

| 5,588,690 | A | 12/1996 | Showalter |
| 6,739,645 | B2 | 5/2004 | Papendorf |
| 8,235,449 | B2 | 8/2012 | Hashimoto |
| 9,333,840 | B1* | 5/2016 | Pino ......................... B60J 7/104 |
| 9,849,762 | B2* | 12/2017 | Tyrer ........................ B60J 7/10 |
| 2002/0060479 | A1 | 5/2002 | Tolinskki |
| 2014/0292020 | A1* | 10/2014 | Gallo ..................... B60J 7/1278 296/116 |

* cited by examiner

*Primary Examiner* — Pinel E Romain
(74) *Attorney, Agent, or Firm* — Vincent G. LoTempio; Kloss, Stenger & LoTempio; David T. Stephenson (57) ABSTRACT

An open-air car canopy and cover assembly and method of operation provides a rearwardly extending canopy that shields an uncovered rear deck of an open-air car from a deployed position, and when in an undeployed position, the panels retract, becoming limp and folding upon themselves. An upper pocket covers the panel folds in the undeployed position by encapsulating the panels and the rotatable supporting bracket. Lateral and rear flaps having fasteners and rear flap fasteners retain the panels out of the rear sight line and side openings of the open-air car. A roof mount detachably attaches the canopy to the roof of the open-air car with a curved flange that hooks over a roof support structure, and metallic tensioned hooks that hook under the roof support structure. A tensioned hinge member is operable with rotatable supporting bracket to retain canopy in a fixed position between deployed and undeployed positions.

20 Claims, 11 Drawing Sheets

OPEN-AIR CAR CANOPY AND COVER ASSEMBLY AND METHOD OF OPERATION

CROSS REFERENCE OF RELATED APPLICATIONS

This application claims the benefits of U.S. provisional application No. 62/505,306, filed May 12, 2017 and entitled CANOPY COVER AND ROOF SNAP-ON TRACK, which provisional application is incorporated by reference herein in its entirety.

FIELD OF THE INVENTION

The present invention relates generally to an open-air car canopy and cover assembly and method of operation. More so, the present invention relates to a rearwardly extending canopy that shields an uncovered rear deck of an open-air car from a deployed position, and when in an undeployed position, a upper panel and a rear panel of the canopy drape between their rotatable supporting bracket while each of a pair of side panels of the canopy is limp and folded upon itself; whereby an upper pocket encapsulates the rotatable supporting bracket and the panels in the undeployed position; whereby lateral and rear flaps having fastening members that retain the panels out of the rear sight line and the side openings of the open-air car; whereby a roof mount detachably attaches the canopy to the roof of the open-air car through use of a curved flange that hooks over a roof support structure, and metallic tensioned hooks that hook under the roof support structure; and whereby a tensioned hinge member is operable with the rotatable supporting bracket to retain the canopy in a fixed position at or between the deployed and undeployed positions.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a golf cart is a small motorized vehicle for carrying golfers and their equipment across a golf course. Golf carts commonly have a seating cabin covered by a roof and an uncovered rear deck or compartment. This rear compartment is used to hold a golf bag and clubs, a sweater basket, as well as other gear, during use of the cart. Golfers within the covered cabin may be protected during rain; but the golf clubs remain exposed to the elements, and thereby get wet and slippery.

Often, golf carts install a rear compartment canopy to protect the rear compartment and its contents. The canopy can be easily opened as needed to access the contents carried in the rear compartment and closed when the cart is not in use. It is known in the art to have canopies for golf cart rear compartments. Generally, it advantageous for the canopy to unfold over and in close proximity to the clubs to minimize exposure to the weather. The canopy is often a portable, removable rear cover having a resilient cover that drapes over hingedly rotatable, or sliding supporting brackets.

In many instances, the canopy can be moved between a deployed position and an undeployed position. Currently available canopies are releasably secured in the non-operative, undeployed, condition by means of a hook and loop-type fasteners including a loop bundle strip attached at one end to the back section of the cover section and a hook bundle strip fixedly secured atop an attachment member. Snaps are also used to secure the canopies when undeployed.

Typically, when the canopy is undeployed it is folded-up upon itself so that the roof-like and the rear parts of the canopy drape between their supporting brackets while each of the side panels of the canopy is limp and folded upon itself. The folds of the panels tend to collect moisture, dust, bugs, and general debris that enter the folds from the open parts at the top and also from the sides.

Other proposals have involved covering the open rear compartment of a golf cart with a canopy structure. The problem with these golf cart canopies is that the panels fold into themselves, which provides a crevice for moisture, debris, and bugs to enter. Also, the panels cannot be retained in a folded away position to clear the rear line of sight, or cover the rear open area more effectively. Even though the above cited golf cart canopies meet some of the needs of the market, an open-air car canopy and cover assembly providing a rearwardly extending canopy that provides an upper pocket for encapsulating the rotatable supporting bracket and the panels in the undeployed position; lateral and rear flaps having fastening members to retain the panels out of the rear sight line and the side openings of the open-air car; a roof mount that detachably attaches the canopy to the roof of the open-air car through use of a curved flange that hooks over a roof support structure, and metallic tensioned hooks that hook under the roof support structure; and a tensioned hinge member that is operable with the rotatable supporting bracket to retain the canopy in a fixed position at or between the deployed and undeployed positions, is still desired.

SUMMARY

Illustrative embodiments of the disclosure are generally directed to an open-air car canopy and cover assembly. The open-air car canopy and cover assembly provides a rearwardly extending canopy comprising a rotatable supporting bracket that supports an upper panel, a rear panel, and a pair of side panels. The rotatable supporting bracket attach to the rear section of the open-air car at a pivot portion for pivotally connecting the canopy frame structure to the open-air car.

When the canopy is disposed in a deployed position, the panels shield an uncovered rear deck of the open-air car. When the canopy is disposed in an undeployed position, the upper panel and the rear panel of the canopy drape between their rotatable supporting bracket while each of the side panels is limp and folded upon itself. The folds in the panels have a tendency to collect dirt, moisture, and other undesirable debris.

The assembly provides an upper pocket that encapsulates the upper panel and rotatable supporting bracket in the undeployed position; thereby forming a protective cover over the upper panels and folds therein. The upper pocket also works to securely retain the upper panel and rotatable supporting bracket in the undeployed position.

The assembly provides a rear flap that integrally extends from the rear panel of the canopy. The rear flap is defined by a lower hem having a plurality of rear flap fastening members. The rear flap folds upwardly so that the rear flap fastening members couple to a roof support structure or metallic tensioned hooks, described below. This works to retain the rear panel out of the rear sight line of the open-air car. In the deployed position, the magnets can be decoupled from the roof support structure, so that the rear panel falls and covers the open rear section.

The assembly provides a pair of lateral flaps that integrally extend from the side panels of the canopy. The lateral flaps are defined by a lower hem having a plurality of fasteners. The lateral flaps fold inwardly so that the fasteners couple to corresponding fasteners at the rear panel. The inward disposition of the lateral panels works to cover the rear section of the open-air car.

The assembly provides a roof mount that detachably attaches the canopy to the roof of the open-air car. The roof mount is generally elongated, being about as wide as the rear section of the open-air car. The roof mount comprises a first end having a curved flange that hooks over a roof support structure of the open-air car, and a plurality of metallic tensioned hooks that hook under the roof support structure, and couple to flanges or ribs under the roof of the open-air car. The curved flange and metallic tensioned hooks create sufficient tension so that the canopy remains attached to the rear section of the open-air car. The metallic tensioned hooks provide a metal material that enables the rear flap fastening members to couple thereto, while retaining the rear panel.

The assembly provides a tensioned hinge member that is operable with the rotatable supporting bracket. The tensioned hinge member fits into the pivot portion of the rotatable supporting bracket, creating a snug, frictional relationship in the pivot portion that helps to retain the canopy in a fixed position, at or between the deployed and undeployed positions. This works to enable the canopy to be extended to cover items such as golf bags, or folded out of the way to provide access to the items.

In one aspect, the metallic tensioned hooks that hook under the roof support structure and couple to a flange or rib adjacent to the roof support structure.

In another aspect, the tensioned hinge member comprises a tensioner screw.

In another aspect, the roof mount has a length about the length of the rear section of the open-air car.

In another aspect, the upper panel comprises a forward edge.

In yet another aspect, the forward edge comprises an open hem that receives a bar.

In yet another aspect, the bar slidably fits into the channel of the second end of the roof mount, whereby the upper panel detachably attaches to the roof mount.

In yet another aspect, the rear panel comprises a vinyl window.

In yet another aspect, the lower hem of the rear flap is elasticized.

In yet another aspect, the hem of the lateral flaps is elasticized.

In yet another aspect, the fasteners of the lateral flaps comprise a snap button.

In yet another aspect, the corresponding fasteners in the rear panel comprise a corresponding snap button.

In yet another aspect, the rear flap is sewn to the rear panel.

In yet another aspect, the lateral flaps are sewn to the side panels.

In yet another aspect, the panels comprises a resilient material.

In yet another aspect, the rear panel comprises an elasticized rear hem.

In yet another aspect, the open-air car comprises a golf cart.

One objective of the present invention is to protectively cover the folds that form in the panels of a golf cart canopy in the undeployed position, so as to prevent moisture, bugs, and debris from entering.

Another objective is to securely retain the canopy in a fixed position, at or between the deployed and undeployed positions through use of a tensioning screw.

Yet another objective is to retain the rear panel of the canopy out of the line of sight of the occupants of the open-air car.

Yet another objective is to detachably attach the rear panel to the metallic tensioned hooks at the roof support structure in a folded up position through utilization of magnets.

Yet another objective is to provide a roof mount that secures to the roof support structure of the golf cart in a snap-fit relationship.

Yet another objective is to provide metallic tensioned hooks that hook under the roof support structure, and couple to flanges or ribs under the roof of the open-air car.

Yet another objective is to enable the curved flange and metallic tensioned hooks to create sufficient tension so that the canopy remains attached to the rear section of the open-air car.

Yet another objective is to provide a portable, removable golf cart canopy for its rear golf cart compartment that can be easily opened to a deployed position, and retracted to an undeployed position.

Yet another objective is to unfold the canopy panels over and in close proximity to golf clubs in the cart rear compartment to minimize exposure to the weather.

Yet another objective is to provide an open-air car canopy and cover assembly that can be attached to a golf cart without altering or modifying the golf cart.

Yet another objective is to provide an open-air car canopy and cover assembly that is durable.

Yet another objective is to provide an open-air car canopy and cover assembly that is easy to use.

Yet another objective is to provide an open-air car canopy and cover assembly that is inexpensive to fabricate and is easy to integrate into an existing canopy design.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An open-air car canopy and cover assembly 100 and method 400 of operation is referenced in FIGS. 1-12. Open-air car canopy and cover assembly 100, hereafter "assembly 100" is operational and detachably attachable to an open-air car 200. A roof mount 122 detachably attaches the canopy to the roof of the open-air car 200 with a curved flange 126 that hooks over a roof support structure 206, and metallic tensioned hooks 132 that hook under the roof support structure 206.

Figure 3:
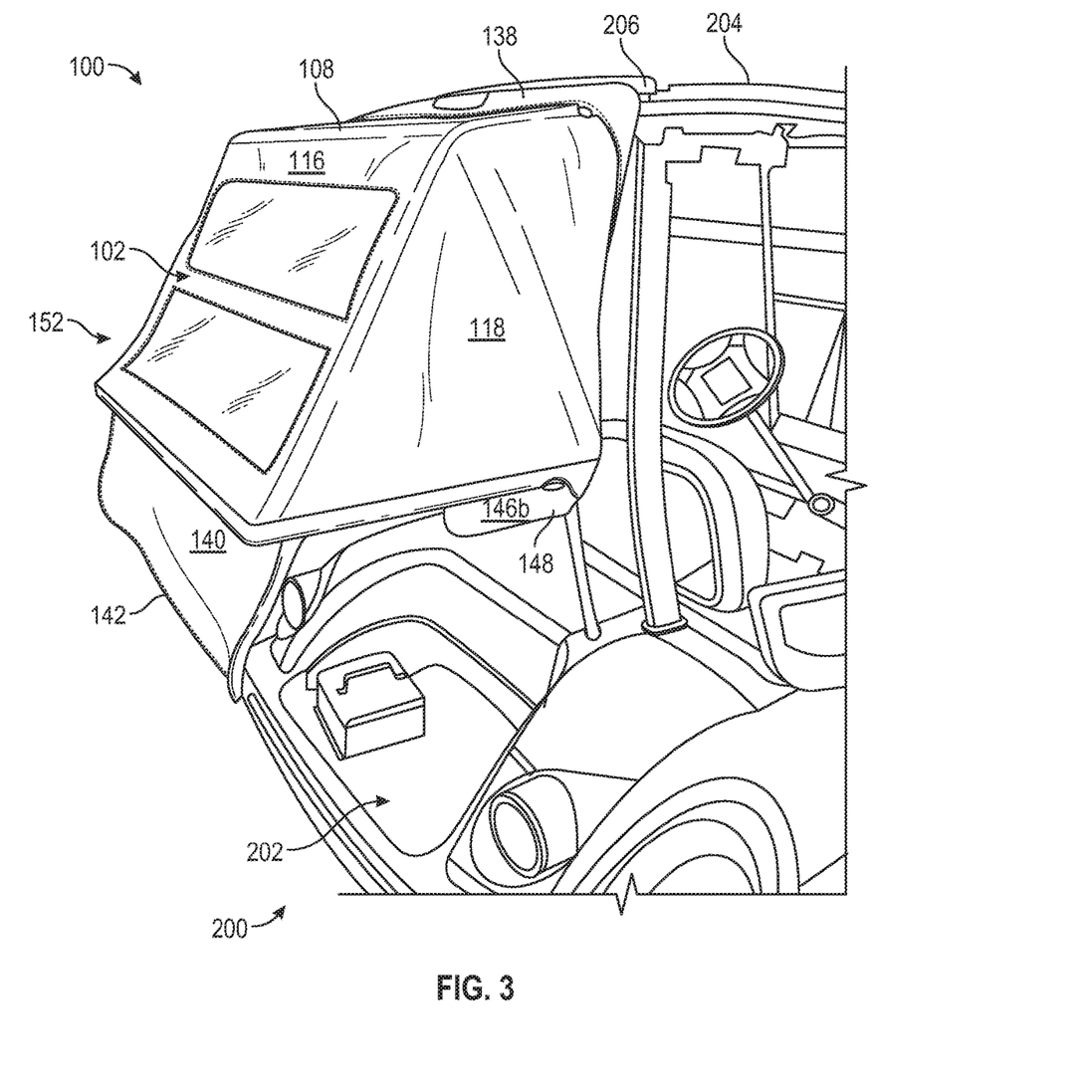
FIG. 3 illustrates a rear perspective view of an exemplary open-air car canopy and cover assembly, in a deployed position, in accordance with an embodiment of the present invention.

As referenced in FIG. 3, assembly 100 provides a rearwardly extending canopy 102 comprising a rotatable supporting bracket 104 defined by a plurality of ribs 106 that hinge about a pivot portion 156 to carry multiple, resilient panels 108, 116, 118a-b outwardly to a deployed position 152 for covering an open rear section 202 of an open-air car 200. Ribs 106 rotate about the pivot portion 156 inwardly to retract the panels to an undeployed position 154, causing the panels 108 to fold into themselves and become limp. A tensioned hinge member 120 is operable in the pivot portion 156 of the rotatable supporting bracket 104. Tensioned hinge member 120 helps retain the canopy in a fixed position at or between the deployed and undeployed positions 152, 154.

An upper pocket 138 encapsulates the folded panels in the undeployed position 154; thereby preventing debris and moisture from entering the folds of canopy. Upper pocket 138 is generally elongated. Upper pocket 138 is sewn across the top edge and upper side edges of panels of canopy 102. Rear and lateral flaps 140, 146a-b integrally join their respective panels 116, 118a-b. Flaps 140, 146a-b are defined by hems studded with rear flap fastening members 144, including various fastening means that attach to roof mount and rear panel fasteners, so as to retain the panels out of the rear sight line and the side openings of open-air car 200. In one embodiment, a lower support bar 158 extends between the lateral flaps 146a-b to provide additional support. Lower support bar may attach to any mounting surface in open rear section 202 of open-air car 200.

In one non-limiting embodiment, open-air car 200 may include an electric golf cart, a gas-powered golf cart, and a buggy used to carry a driver, a passenger, and sporting equipment, such as golf clubs. Configurations of open-air car 200 comprises an open frame that does not have side doors or a rear enclosures, but rather remains exposed to external elements. Open-air cars 200 further comprise a roof support structure 206 for supporting a roof 204 over the open frame; an open rear section 202, such as a deck, that carries items; wheels; an electrical or gas power source; and steering components.

Figure 1:
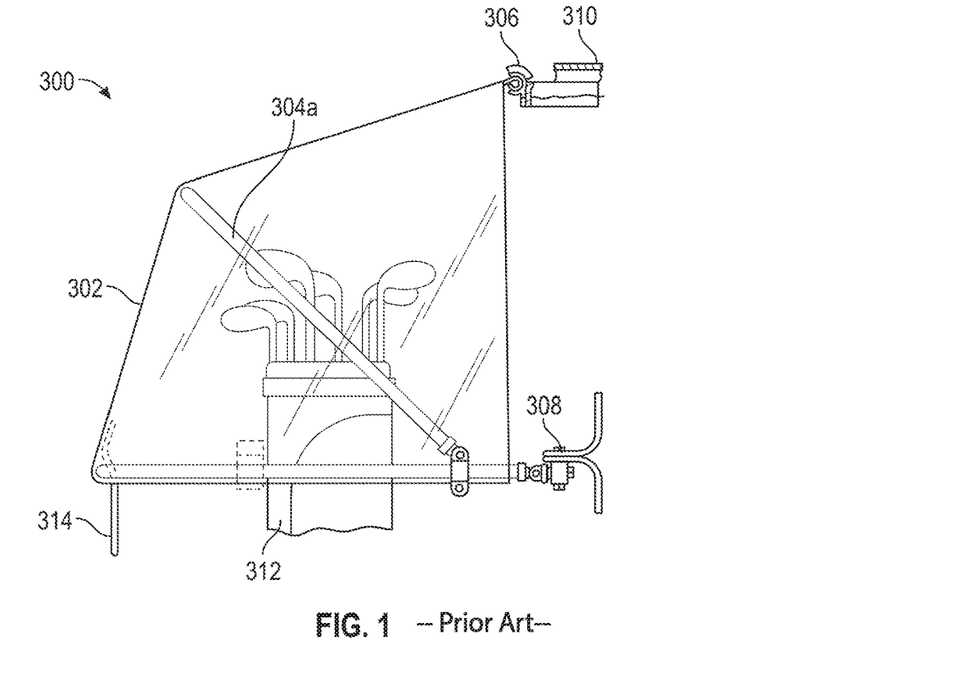
FIG. 1 illustrates a side view of a prior art golf cart canopy deployed to cover golf clubs, in accordance with an embodiment of the present invention.
Figure 2:
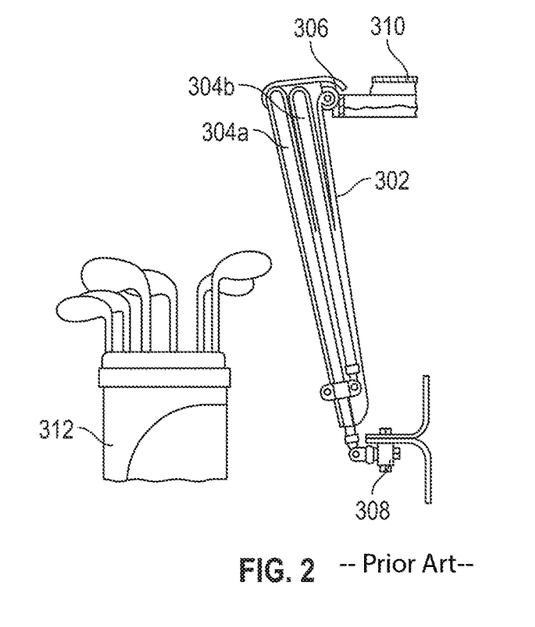
FIG. 2 illustrates a side view of the prior art golf cart canopy shown in FIG. 1, undeployed to leave the golf clubs exposed, in accordance with an embodiment of the present invention.

It is well known in the sport that wet golf club grips can hinder the performance of the player and is undesirable. Thus, as FIG. 1 illustrates, the prior art golf carts installs a rear compartment canopy 300 cover to protect golf bags and clubs 312 located in the rear bag storage compartment from rain and damp weather conditions. The canopy 300 is often a portable, removable rear cover having a resilient cover 302 that drapes over hingedly rotatable, or sliding supporting brackets 304a, 304b. An upper canopy bracket 306 is detachably fastened to a roof structure on the golf cart. A side support structure on the golf cart can also serve as a lower fastening point for a lower canopy bracket 308. As FIG. 1 illustrates, the canopy 300 can be easily opened as needed to access the golf bags and clubs 312 carried in the rear compartment 314; and closed when the cart is not in use (FIG. 2).

As referenced in FIG. 3, assembly 100 of the present invention comprises a rotatable supporting bracket 104 defined by a multiple ribs 106 joined at a pivot portion 156. In one non-limiting embodiment, ribs 106 are structurally rigid, and have a generally U-shape. Ribs 106 are spaced-apart, and may be fixed or movable relative top each other. Ribs 106 support multiple panels 108, 116, 118a-b that cover different open areas of the open-air car 200.

Pivot portion 156 of rotatable supporting bracket 104 may include a hinge hole/axle configuration that pivotally connects rotatable supporting bracket 104 to an open rear section 202 of an open-air car 200. Though in other embodiments, pivot portion 156 may include any hinging and pivoting enabling mechanism known in the art may be used as the pivot portion 156.

Figure 4:
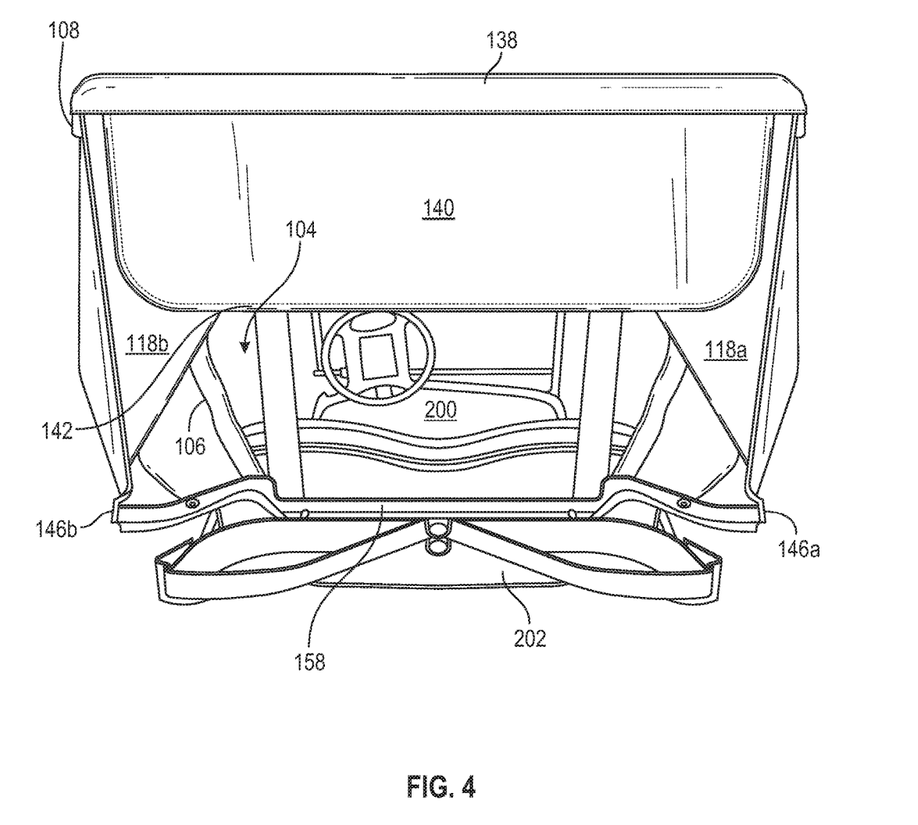
FIG. 4 illustrates a rear view of the open-air car canopy and cover assembly shown in FIG. 3, in accordance with an embodiment of the present invention.

As shown in FIG. 4, panels include an upper panel 108, a rear panel 116, and a pair of side panels 118a, 118b. Upper panel 108 is disposed generally parallel with the ground surface and the roof 204 of open-air car 200. Upper panel 108 is flat, planar, and generally larger than the rear and side panels 116, 118a, 118b. Upper panel 108 comprises a forward edge 110 adjacent roof support structure 206 of roof 204.

Figure 5:
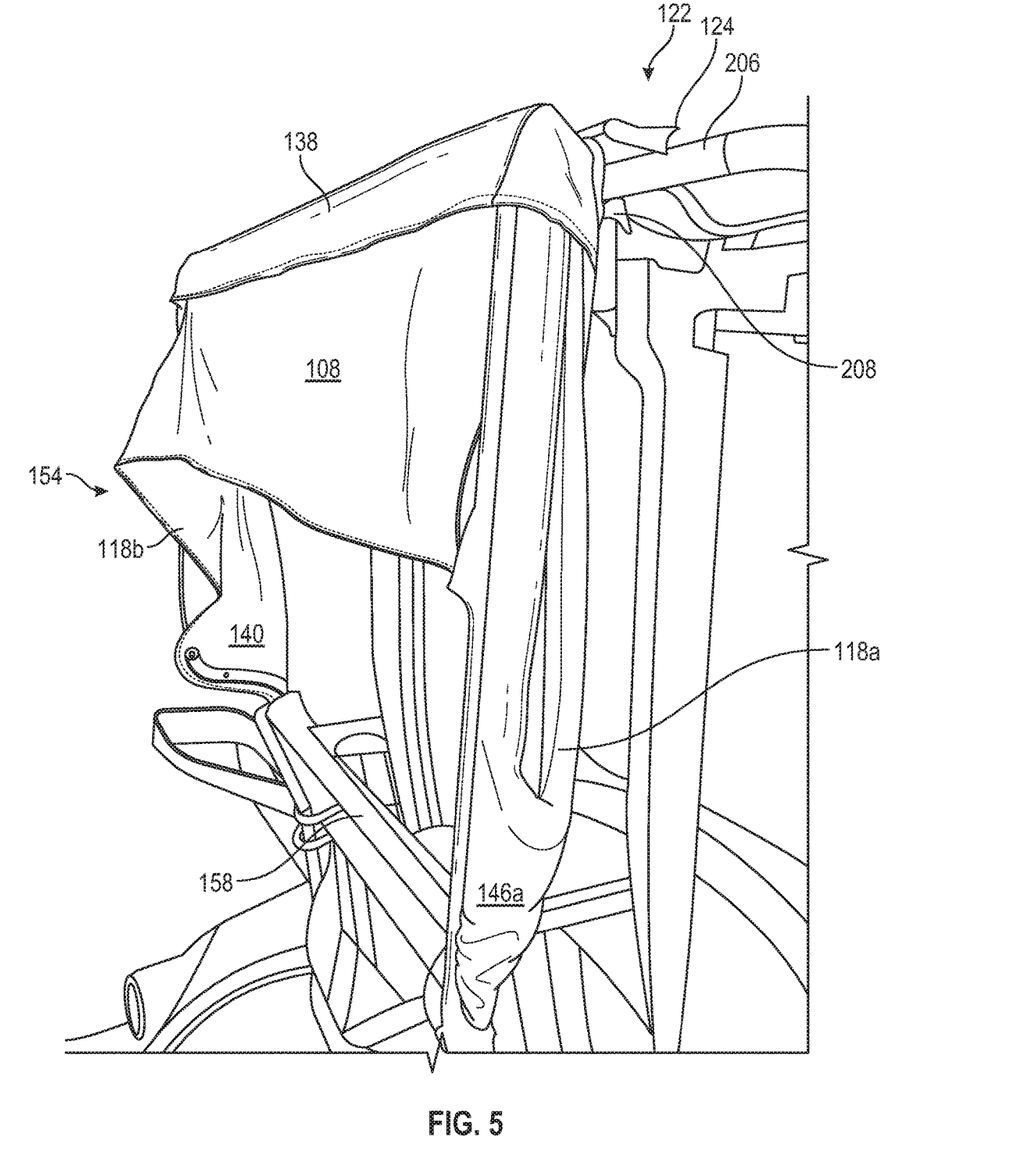
FIG. 5 illustrates a perspective view of the open-air car canopy and cover assembly shown in FIG. 3, in an undeployed position, in accordance with an embodiment of the present invention.

Forward edge 110 of upper panel 108 may be configured to have an open hem 112 that receives a bar 114 used for coupling upper panel 108 to roof support structure 206 of open-air car 200, as described below. Upper panel 108 covers the open top section of open-air car 200 from the deployed position 152. From undeployed position 154, upper panel 108 forms folds between ribs 106 of the canopy 102 (FIG. 5). Those skilled in the art will recognize that debris, moisture, and bugs often fall into such folds between ribs 106.

Rear panel 116 is joined with upper panel 108 at a shared edge. Rear panel 116 is disposed rearward of upper panel 108, generally perpendicular to the roof 204. Rear panel 116 covers the open rear section 202 of the open-air car 200 from deployed position 152. In one non-limiting embodiment, vinyl window forms in rear panel 116. Side panels 118a, 118b are joined to both the upper and rear panels 108, 116 at shared edges. From deployed position 152, the side panels 118a, 118b cover the driver side and passenger side opening of open-air car 200. From the undeployed position 154, the side panels 118a, 118b are limp and folded into themselves.

Thus, when the rotatable supporting bracket 104 is disposed in a deployed position 152, the panels at least partially cover the open rear section 202 the open-air car 200. When rotatable supporting bracket 104 is disposed in an undeployed position 154, the upper panel 108 and rear panel 116 drape between the ribs 106, while the side panels 118a, 118b are generally disposed limp and folded into themselves.

In some embodiments, panels 108, 116, 118a-b are fabricated from a resilient material adapted to folding and easy compatibility. Suitable materials for panels 108, 116, 118a-b may include, without limitation, vinyl, vinyl mesh, acrylic, polyester and polyethylene. In one non-limiting embodiment, panels 108, 116, 118a-b are constructed with elasticized hems and peripheral regions that enable snug interaction with the sides and rear section 202 of the open-air car 200.

Figure 11:
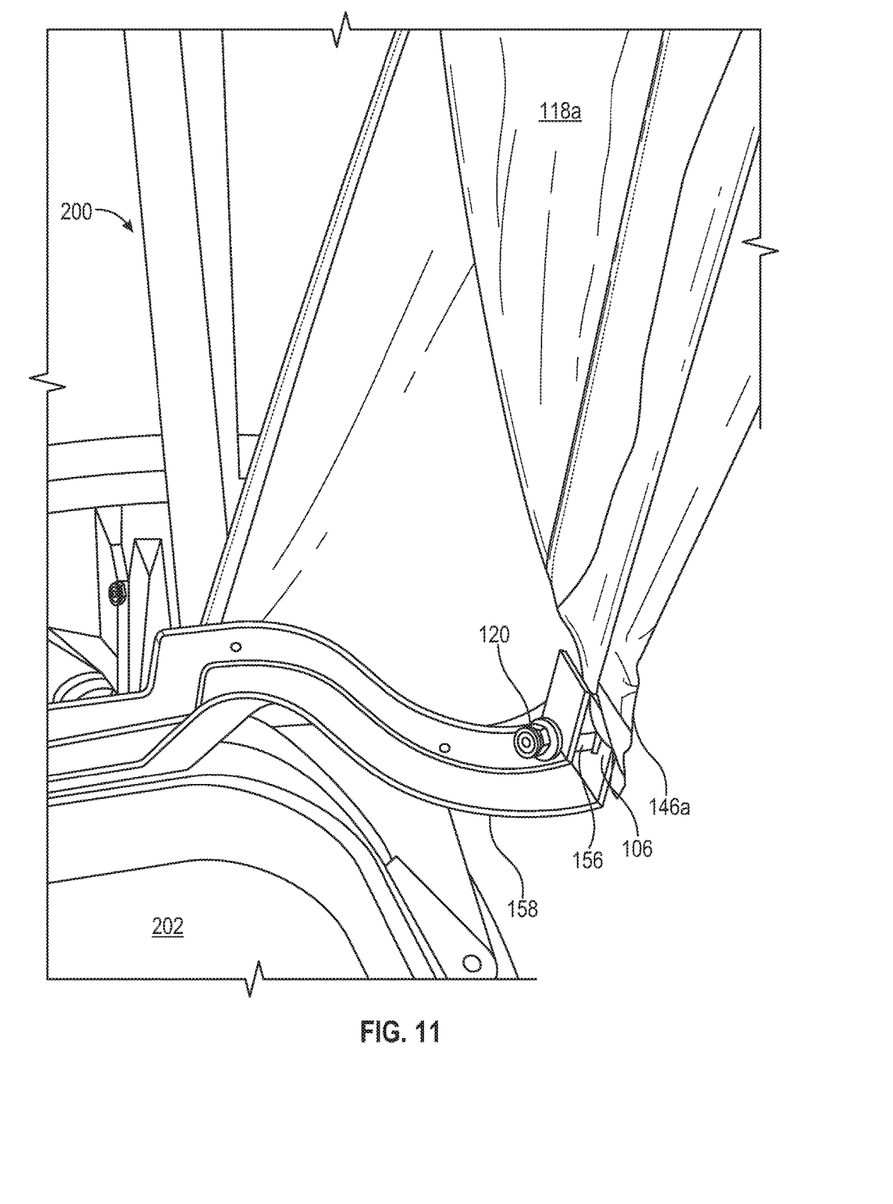
FIG. 11 illustrates a perspective view of an exemplary tensioned hinge member fastened at the pivot portion of the rotatable support bracket, in accordance with an embodiment of the present invention.

Turning now to FIG. 11, assembly 100 further includes a tensioned hinge member 120 that is sized and dimensioned to operatively fit into the pivot portion 156 of the rotatable supporting bracket 104. Tensioned hinge member 120 is configured to create tension at the pivot portion 156, such that the rotatable supporting bracket 104 is fixedly disposed at or between the deployed and undeployed positions 152, 154. In one non-limiting embodiment, tensioned hinge member 120 comprises a tensioner screw. Though in other embodiments, any hinging and tensioning mechanism known in the art may be used.

Figure 6:
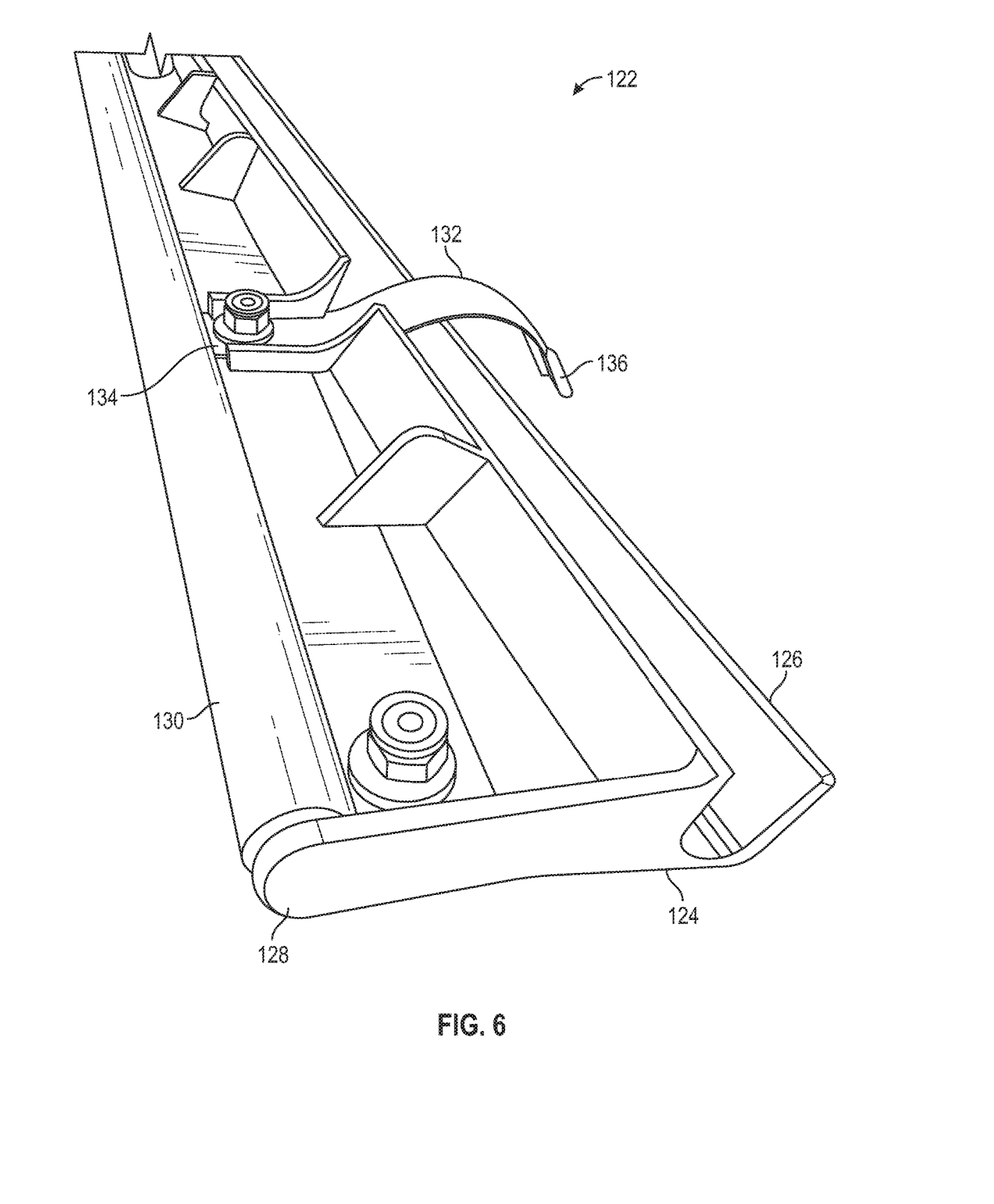
FIG. 6 illustrates a perspective view of an exemplary roof mount, in accordance with an embodiment of the present invention.
Figure 7:
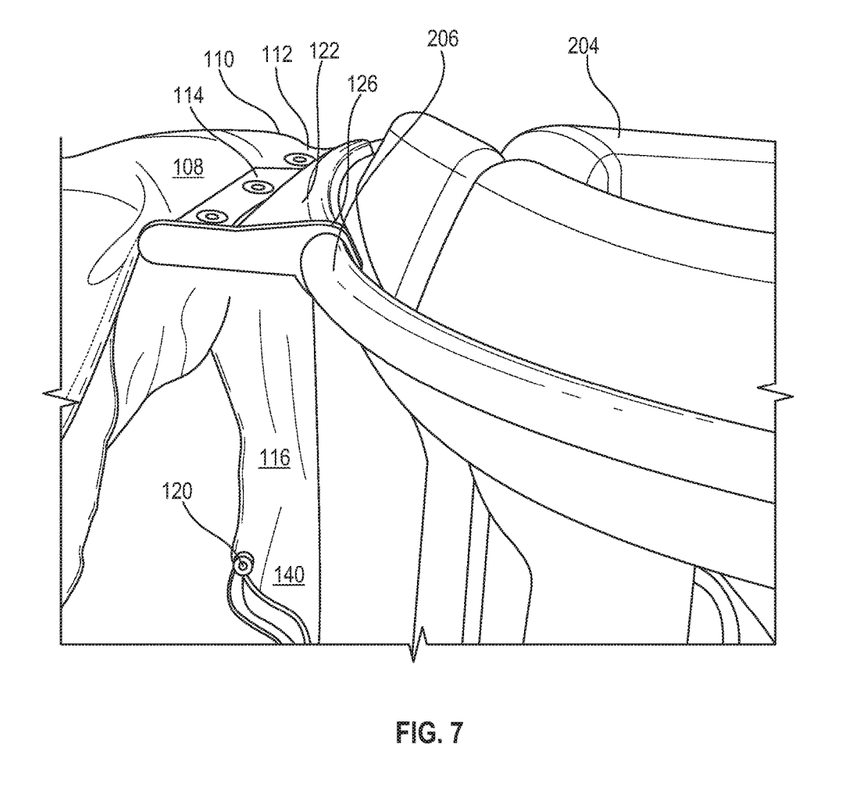
FIG. 7 illustrates a perspective view of the roof mount connecting the upper panel of the canopy to the roof support structure, in accordance with an embodiment of the present invention.

As FIG. 6 illustrates, a roof mount 122 is used to detachably attach rotatable supporting bracket 104 to a roof support structure 206 at the roof 204 of open-air car 200. Roof mount 122 is generally elongated, and about as wide as the rear section 202 of the open-air car 200. This length allows the entire rear panel 116 to mate easily with roof support structure 206; thereby creating a stronger connection with the roof 204 (FIG. 7). Roof mount 122 is unique in that a snap-fit, quick release connection is formed with roof support structure 206. This allows assembly 100 to attach to any type of open-air car without altering or modifying the open-air car.

In one non-limiting embodiment, roof mount 122 comprises a first end 124 having a curved flange 126 that hooks over the roof support structure 206. Curved flange 126 is a unitary, longitudinal component that extends longitudinally across roof mount 122. Curved flange 126 may be fabricated from a resilient polymer that allows for slight bending and creation of a tension, such as a snap-fit interconnection with roof support structure 206, and fitted engagement with flange 208 or rib at bottom of roof 204. Curved flange 126 may include multiple curved flanges dispose din a spaced-apart relationship along the length of roof mount 122.

Roof mount 122 further has a second end 128 defined by a channel 130. The bar 114 in the open hem 112 of upper panel 108 slidably fits into the channel 130. Bar 114 and channel 130 interaction is snug, but still allow for detachable attachment between forward edge 110 of upper panel 108 and roof mount 122. Though in other embodiments, attachment means other than bar 114 and channel 130 interconnection may be used, including snap buttons, magnets, or adhesives may detachably attach forward edge 110 of upper panel 108 to roof mount 122.

Figure 10:
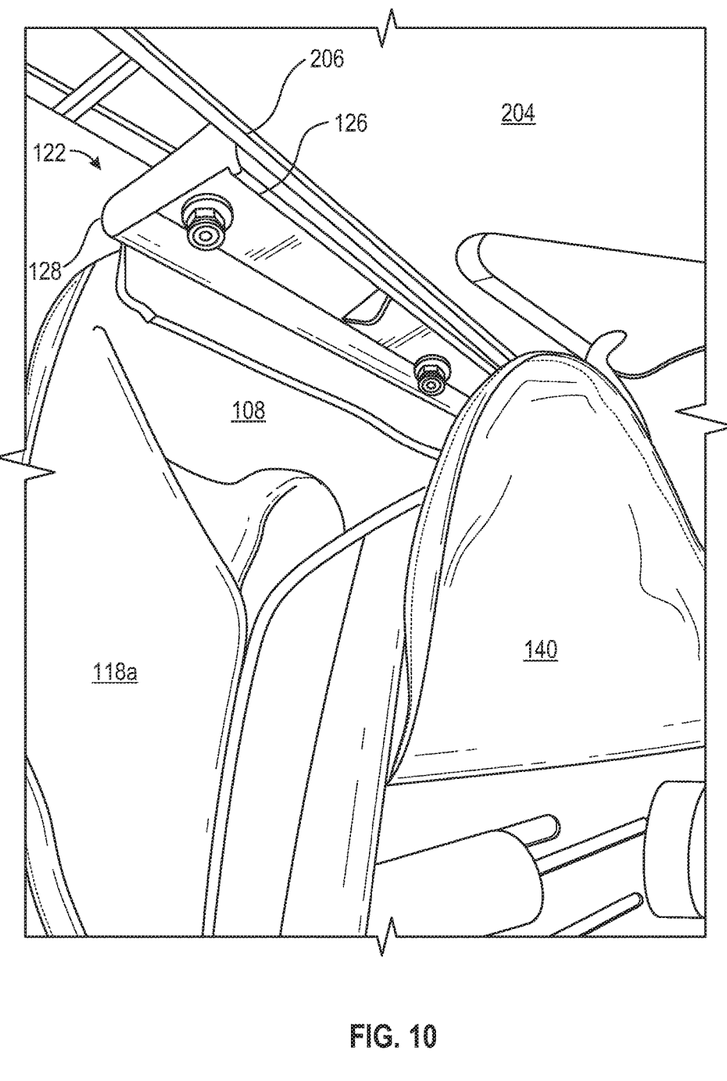
FIG. 10 illustrates a perspective view of the roof mount attached to the roof support structure, in accordance with an embodiment of the present invention.

Looking now at FIG. 10, a plurality of metallic tensioned hooks 132 are operable to work with roof mount 122. Metallic tensioned hooks 132 are configured to hook under the roof support structure 206. Similar to curved flange 126, the metallic tensioned hooks 132 may be fabricated from a resilient polymer that allows for slight bending and creation of a tension, such as a snap-fit interconnection with roof support structure 206.

In one non-limiting embodiment, metallic tensioned hooks 132 include a free end 136 that fastens to roof mount. Further, metallic tensioned hooks 132 include a mount end 134 that hooks under the roof support structure 206 and couple to a flange 208 or rib adjacent to the roof support structure 206. Thus, the opposing positions of metallic tensioned hooks 132 and curved flange 126 on first end 124 of roof mount 122 is designed to create tension therebetween. The tension helps retain rotatable supporting bracket 104 to the roof support structure 206 of open-air car 200. This allows first end 124 of roof mount 122 to attach to roof support structure 206 on roof 204.

As discussed above, roof mount 122 comprises a second end 128 defined by a channel 130. Bar 114 from the forward edge 110 of the upper panel 108 is sized and dimensioned to slidably fit into the channel 130 forming in the roof mount 122. In this manner, upper panel 108 detachably attaches to the roof mount 122, which is itself detachably attached to the roof support structure 206.

Figure 8:
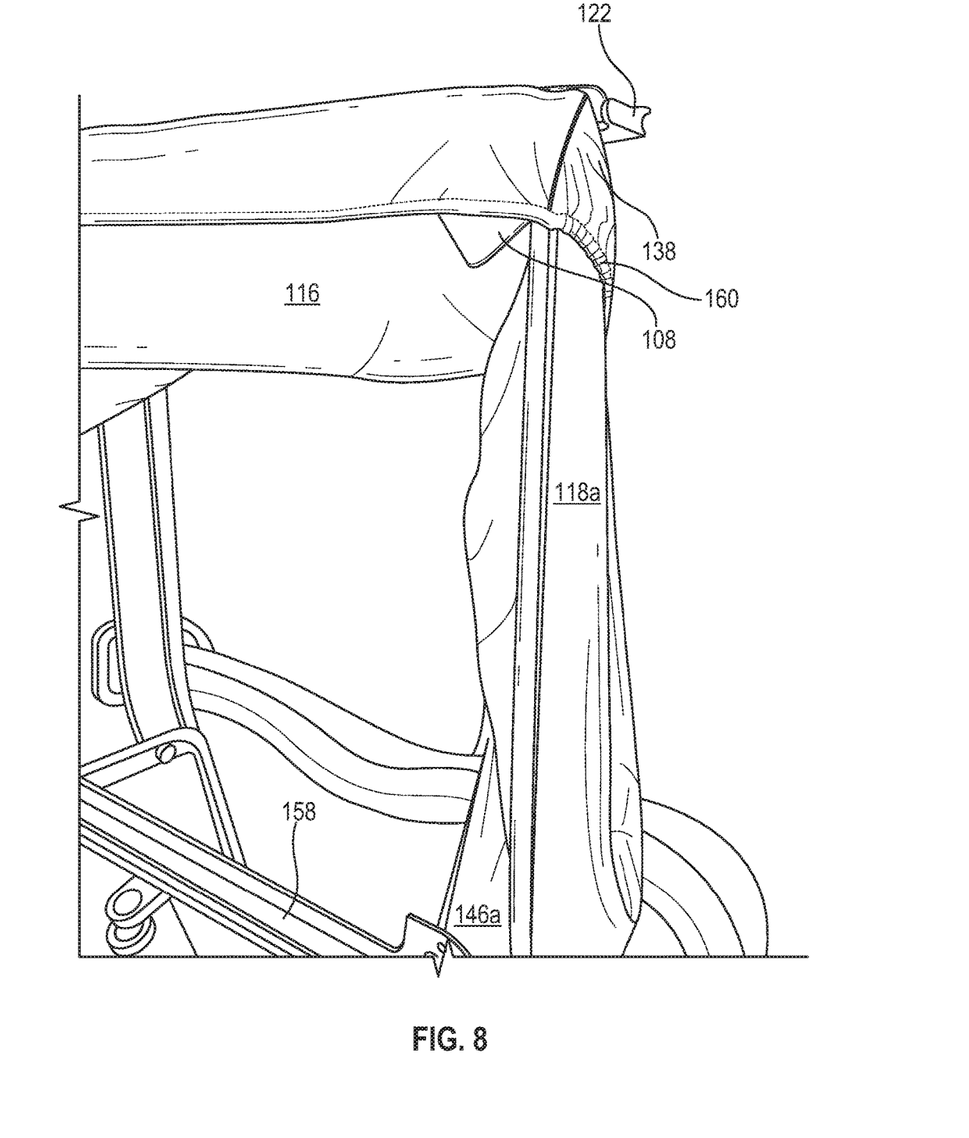
FIG. 8 illustrates a perspective view of an exemplary upper pocket, in accordance with an embodiment of the present invention.

Turning to FIG. 8, an upper pocket 138 integrally joins upper and side panels 118a, 118b, positioning approximately near roof support structure 206. Upper pocket 138 encapsulates the folded panels in the undeployed position 154; thereby preventing debris and moisture from entering the folds. Upper pocket 138 is generally elongated; thereby allowing upper pocket 138 to be sewn across the forward edge 110 of upper panel 108, and along with the upper side edges of canopy 102. Also, the upper pocket 138 is sufficiently sturdy so as to retain the upper panel 108 and the rotatable supporting bracket 104 in the undeployed position 154 near the roof 204. Upper panel 108 can be easily removed from upper pocket 138 to return to deployed position 152.

Upper pocket 138 has a unique shape that encapsulates upper panel 108, rotatable supporting bracket 104, and other parts of canopy 102 while retracted into the undeployed position 154. In this manner, the panel folds between the ribs 106 are protected from debris, moisture, and bugs entering therein. However in some embodiments, upper pocket 138 has an elasticized edge 160 that allows upper pocket 138 to form-fit the upper panel 108, rotatable supporting bracket 104, and other upper edges of canopy 102; thereby enabling full encapsulation thereof.

However it is significant to note that the elasticized edge is not necessary, since the elongated, shape that extends across the length of the canopy 10-2 and to the edges/corners of the canopy are sufficient to retain the canopy panels and flaps. In yet other embodiments, a hook and loop fastener, such as Velcro™, a button, a magnet, a zipper, or other canvas fastening mechanisms may be used to help encapsulate upper panel 108, rotatable supporting bracket 104, and other parts of canopy 102 in a form-fitting arrangement.

Figure 9:
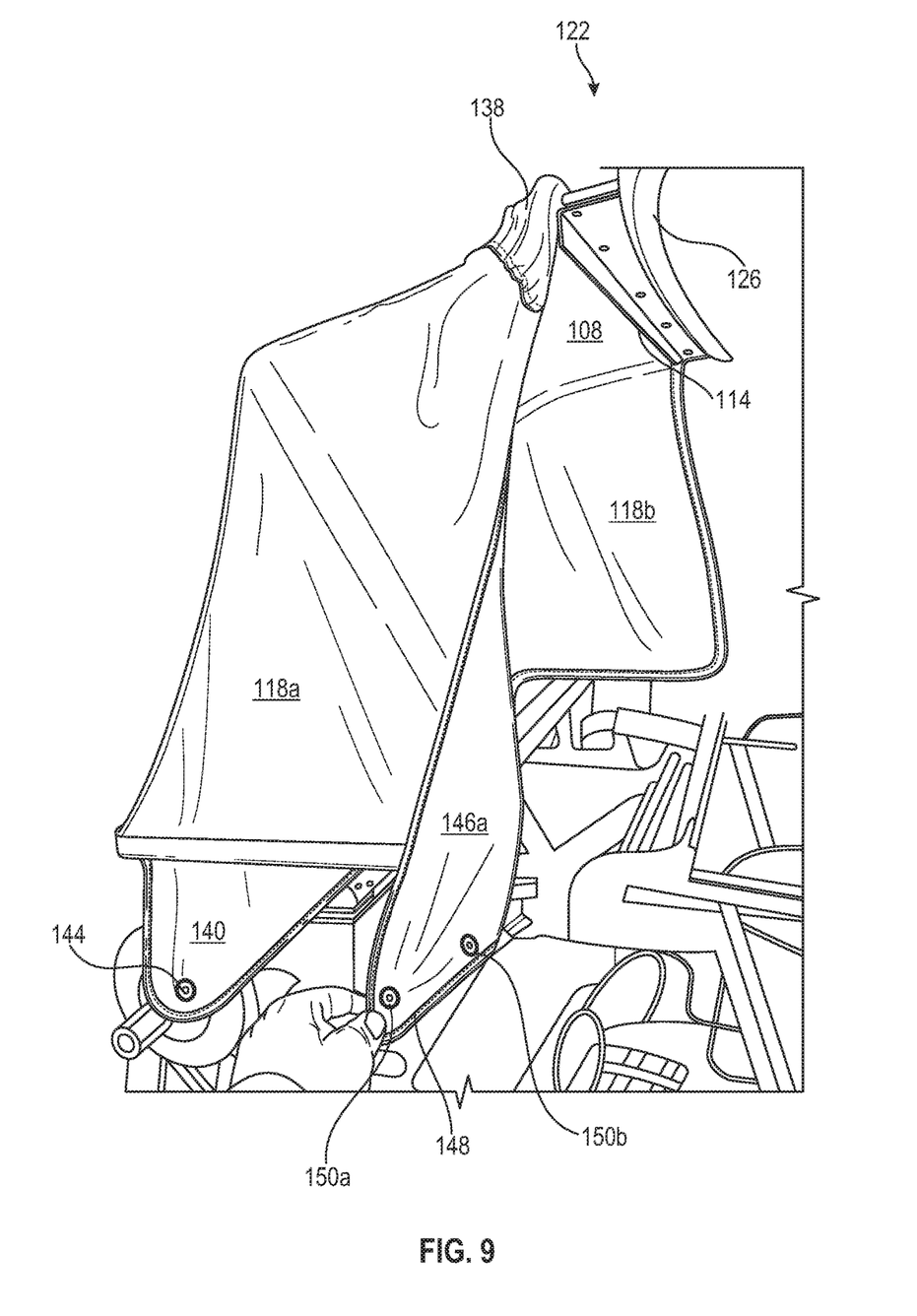
FIG. 9 illustrates a perspective view of the canopy in the deployed position, showing magnetic fasteners on the rear flap and lateral flaps, in accordance with an embodiment of the present invention.

As FIG. 9 illustrates, assembly 100 further includes a rear flap 140 that extends from rear panel 116 of the canopy 102. In one non-limiting embodiment, rear flap 140 is sewn to the rear panel 116, so as to be integral therewith. Rear flap 140 has a lower hem 142 disposed distally from rear panel 116. Lower hem 142 of rear flap 140 may be elasticized for a snug interaction with the rear section 202 of open-air car 200. Lower hem 142 of rear flap 140 comprises a plurality of rear flap fastening members 144, including magnetic buttons, Velcro™ snap buttons, zippers, and friction fit fastening means. In this manner, rear flap 140 is foldable towards the roof of open-air car 200 and can be retained against roof structure.

In this manner, rear flap 140 carries rear panel 116 to the roof support structure 206, where the rear flap fastening members 144 detachably couple to the metallic tensioned hooks 132 at the roof support structure 206. This upward retention of rear panel 116 serves to move rear panel 116 out of the rear sight line of rear section 202 of open-air car 200. This may be useful for driving open-air car 200 in reverse. However, it is significant to note that a magnetic rear flap fastening member would be advantageous because it would be less likely to rust or wear out, as would a metallic fastening means or Velcro™.

Looking back at FIG. 4, a pair of lateral flaps 146a-b extend from the side panels 118a, 118b of the canopy. In one non-limiting embodiment, lateral flaps 146a-b are sewn to a corresponding side panel, so as to be integrally joined therewith. Lateral flaps 146a-b are defined by a hem 148 having a plurality of lateral fasteners 150. Similar to rear flap 140, the lateral flaps 146a-b may be folded inwardly towards the rear section 202 of open-air car 200. This inwardly foldable disposition of lateral panels moves the coverage area of side panels 118a, 118b, so as to increase coverage of rear section 202 of open-air car 200. This can be useful for covering contents in a rear compartment, such as golf clubs, garments, food, etc.

Once folded towards rear panel 116, lateral fasteners 150 detachably couple side panels 118a-b to corresponding fasteners or magnets at the rear panel 116. In one non-limiting embodiment, the lateral fasteners 150 on lateral flaps 146a-b comprise a snap button; and the corresponding fasteners in the rear panel 116 comprising a corresponding snap button. Though in other embodiments, a magnet may be used in place of the snap buttons. Furthermore, the hem 148 of the lateral flaps 146a-b may be elasticized to create snug fit with sides of open-air car 200.

Figure 12:
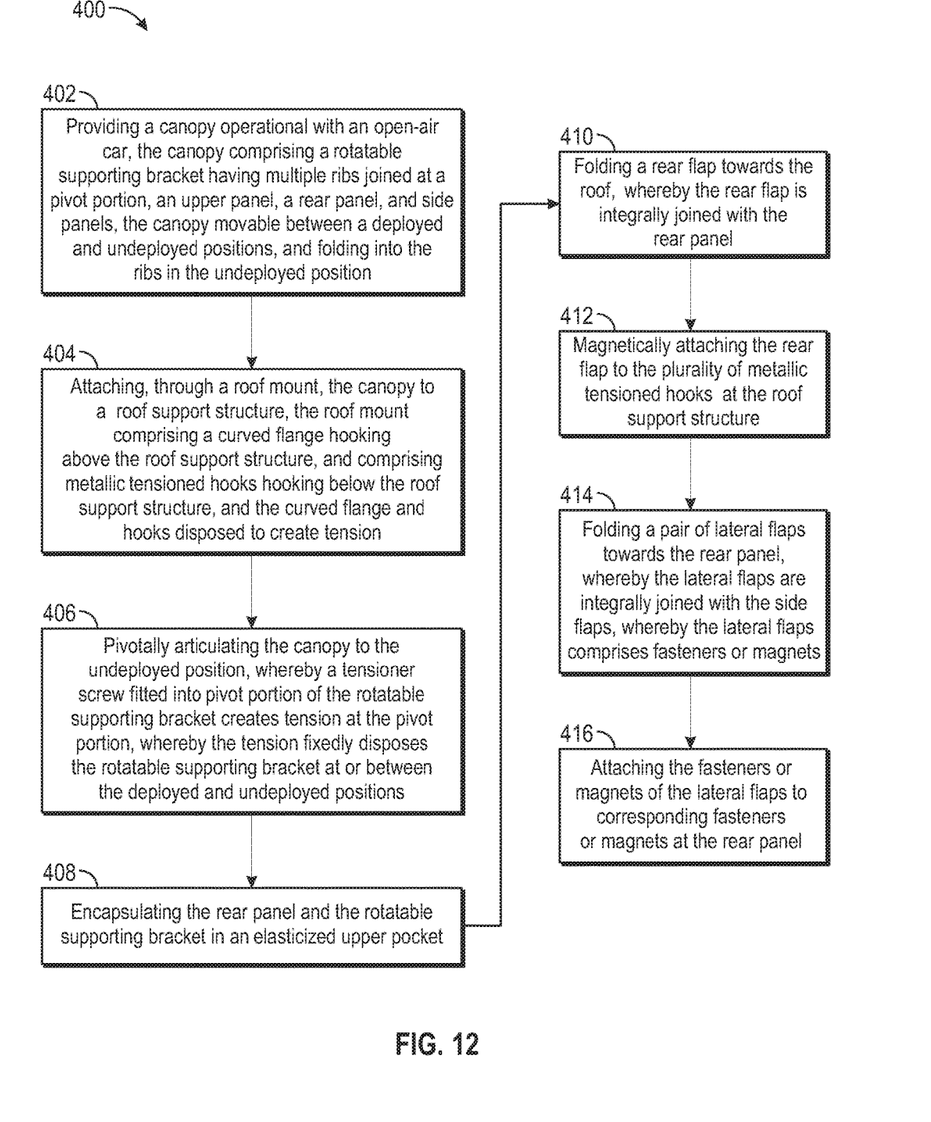
FIG. 12 illustrates a flowchart diagram of an exemplary method for operation of an open-air car canopy and cover assembly, in accordance with an embodiment of the present invention.

FIG. 12 illustrates a flowchart diagram of an exemplary method 400 for operation of an open-air car canopy and cover assembly. Method 400 may include an initial Step 402 of providing a canopy operational with an open-air car, the canopy comprising a rotatable supporting bracket defined by a multiple ribs joined at a pivot portion, an upper panel, a rear panel, and a pair of side panels, the canopy movable between a deployed position and an undeployed position, whereby the panels fold into the ribs in the undeployed position.

The method 400 may further comprise a Step 404 of attaching, through a roof mount, the canopy to a roof support structure, the roof mount comprising a curved flange that hooks above the roof support structure, the roof mount further comprising a plurality of metallic tensioned hooks that hook below the roof support structure, whereby the curved flange and metallic tensioned hooks are oppositely disposed to create tension.

A Step 406 includes pivotally articulating the canopy to the undeployed position, whereby a tensioner screw fitted into the pivot portion of the rotatable supporting bracket creates tension at the pivot portion, whereby the tension fixedly disposes the rotatable supporting bracket at or between the deployed and undeployed positions.

In some embodiments, a Step 408 comprises encapsulating the rear panel and the rotatable supporting bracket in an upper pocket.

A Step 410 includes folding a rear flap towards the roof, whereby the rear flap is integrally joined with the rear panel.

In some embodiments, a Step 412 may include magnetically attaching the rear flap to the plurality of metallic tensioned hooks at the roof support structure.

A Step 414 comprises folding a pair of lateral flaps towards the rear panel, whereby the lateral flaps are integrally joined with the side flaps, whereby the lateral flaps comprises fasteners or magnets.

A final Step 416 includes attaching the fasteners or magnets of the lateral flaps to corresponding fasteners or magnets at the rear panel.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An open-air car canopy and cover assembly, the assembly comprising:
   a rotatable supporting bracket defined by a multiple ribs joined at a pivot portion, the pivot portion pivotally connecting the rotatable supporting bracket to an open rear section of an open-air car, the ribs supporting a upper panel, a rear panel, and a pair of side panels, whereby the panels at least partially cover the open rear section the open-air car when the rotatable supporting bracket is disposed in a deployed position, whereby the upper panel and the rear panel drape between the ribs when the rotatable supporting bracket is disposed in an undeployed position, whereby the side panels are generally limp and folded when the rotatable supporting bracket is disposed in an undeployed position;

a tensioned hinge member fitted into the pivot portion of the rotatable supporting bracket, the tensioned hinge member creating tension at the pivot portion, whereby the tension fixedly disposes the rotatable supporting bracket at or between the deployed and undeployed positions;

a roof mount detachably attaching the rotatable supporting bracket to a roof support structure of a roof on the open-air car, the roof mount being generally elongated, the roof mount comprising a first end having a curved flange hooking the roof support structure, the roof mount further having a second end defined by a channel;

a plurality of metallic tensioned hooks being defined by a mount end attached to the roof mount, the metallic tensioned hooks further being defined by a free end hooking the roof support structure, the free end of the metallic tensioned hooks and the curved flange of the roof mount engaging the roof support structure from opposite sides, whereby the opposing positions of the curved flange and the free end of the metallic tensioned hooks creates tension that retains the rotatable supporting bracket to the roof support structure;

an upper pocket encapsulating the upper panel and the rotatable supporting bracket in the undeployed position, whereby the upper pocket helps retain the upper panel and the rotatable supporting bracket near the roof support structure;

a rear flap extending from the rear panel of the canopy, the rear flap being defined by a lower hem having a plurality of rear flap fastening members, the rear flap being foldable towards the roof, whereby the rear flap carries the rear panel for attachment to the roof support structure, whereby the rear flap fastening members detachably couple to the metallic tensioned hooks or near the roof support structure; and a pair of lateral flaps extending from the side panels of the canopy, the lateral flaps being defined by a hem having a plurality of lateral fasteners, the lateral flaps being foldable rearwardly towards the rear section of the open-air car, whereby the lateral flaps carry the side panels for attachment to the rear panel, whereby the lateral fasteners detachably couple to corresponding fasteners at or near the rear panel.

2. The assembly of claim 1, wherein the tensioned hinge member comprises a tensioner screw.

3. The assembly of claim 1, wherein the roof mount has a length about the length of the rear section of the open-air car.

4. The assembly of claim 1, wherein the metallic tensioned hooks are adapted to hook under the roof support structure and couple to a flange or rib adjacent to the roof support structure.

5. The assembly of claim 1, wherein the upper panel comprises a forward edge.

6. The assembly of claim 5, wherein the forward edge of the upper panel comprises an open hem that receives a bar.

7. The assembly of claim 6, wherein the bar slidably fits into the channel of the second end of the roof mount to enable detachable attachment between the upper panel and the roof mount.

8. The assembly of claim 1, wherein the fasteners of the lateral flaps comprise a snap button.

9. The assembly of claim 8, wherein the corresponding fasteners in the rear panel comprise a corresponding snap button.

10. The assembly of claim 1, wherein the upper pocket comprises an elasticized edge.

11. The assembly of claim 1, wherein the lower hem of the rear flap is elasticized.

12. The assembly of claim 1, wherein the hem of the lateral flaps is elasticized.

13. The assembly of claim 1, wherein the rear flap is sewn to the rear panel.

14. The assembly of claim 1, wherein the lateral flaps are sewn to the side panels.

15. The assembly of claim 1, further comprising a lower support bar extending between the lateral flaps.

16. The assembly of claim 1, wherein the rear panel comprises an elasticized rear hem.

17. The assembly of claim 1, wherein the rear flap fastening members and the lateral fasteners include at least one of the following: a magnet, a magnet button, a snap button, a zipper, an adhesive, a friction fit fastening member, and a hook and loop fastener.

18. A golf cart canopy and cover assembly, the assembly consisting of:

a rotatable supporting bracket defined by a multiple ribs joined at a pivot portion, the pivot portion pivotally connecting the rotatable supporting bracket to an open rear section of an golf cart, the ribs supporting a upper panel, a rear panel, and a pair of side panels, the rear panel comprising an elasticized rear hem, the upper panel comprising a forward edge having an open hem that receives a bar, the panels being generally resilient, whereby the panels at least partially cover the open rear section the golf cart when the rotatable supporting bracket is disposed in a deployed position, whereby the upper panel and the rear panel drape between the ribs when the rotatable supporting bracket is disposed in an undeployed position, whereby the side panels are generally limp and folded when the rotatable supporting bracket is disposed in an undeployed position;

a tensioner screw fitted into the pivot portion of the rotatable supporting bracket, the tensioner screw creating tension at the pivot portion, whereby the tension fixedly disposes the rotatable supporting bracket at or between the deployed and undeployed positions;

a roof mount detachably attaching the rotatable supporting bracket to a roof support structure of a roof on the golf cart, the roof mount being generally elongated, and about as wide as the rear section of the golf cart, the roof mount comprising a first end having a curved flange hooking the roof support structure, the roof mount further having a second end defined by a channel, whereby the bar in the open hem of the upper panel slidably fits into the channel to enable detachable attachment between the upper panel and the roof mount;

a plurality of metallic tensioned hooks being defined by a mount end attached to the roof mount, the metallic tensioned hooks further being defined by a free end hooking the roof support structure, the free end of the metallic tensioned hooks and the curved flange of the roof mount engaging the roof support structure from opposite sides, whereby the opposing positions of the curved flange and the free end of the metallic tensioned hooks creates tension that retains the rotatable supporting bracket to the roof support structure;

an upper pocket encapsulating the upper panel and the rotatable supporting bracket in the undeployed position, whereby the upper pocket helps retain the upper panel and the rotatable supporting bracket near the roof support structure;

a rear flap extending from the rear panel of the canopy, the rear flap being defined by an elasticized lower hem having a plurality of rear flap fastening members, the rear flap being foldable towards the roof, whereby the rear flap carries the rear panel for attachment to the roof support structure, whereby the rear flap fastening members detachably couple to the metallic tensioned hooks or near the roof support structure;

a pair of lateral flaps extending from the side panels of the canopy, the lateral flaps being defined by an elasticized hem having a plurality of lateral fasteners, the lateral flaps being foldable rearwardly towards the rear section of the golf cart, whereby the lateral flaps carry the side panels for attachment to the rear panel, whereby the lateral fasteners detachably couple to corresponding fasteners at or near the rear panel; and a lower support bar extending between the lateral flaps.

19. The assembly of claim 18, wherein the rear flap fastening members and the lateral fasteners include at least one of the following: a magnet, a magnet button, a snap button, a zipper, an adhesive, a friction fit fastening member, and a hook and loop fastener.

20. A method for operation of an open-air car canopy and cover assembly, the method comprising:

providing a canopy operational with an open-air car, the canopy comprising a rotatable supporting bracket defined by a multiple ribs joined at a pivot portion, an upper panel, a rear panel, and a pair of side panels, the canopy movable between a deployed position and an undeployed position, whereby the panels fold into the ribs in the undeployed position;

attaching, through a roof mount, the canopy to a roof support structure, the roof mount comprising a curved flange that hooks above the roof support structure, the roof mount further comprising a plurality of metallic tensioned hooks that hook below the roof support structure, whereby the curved flange and metallic tensioned hooks are oppositely disposed to create tension;

pivotally articulating the canopy to the undeployed position, whereby a tensioner screw fitted into the pivot portion of the rotatable supporting bracket creates tension at the pivot portion, whereby the tension fixedly disposes the rotatable supporting bracket at or between the deployed and undeployed positions;

encapsulating the rear panel and the rotatable supporting bracket in an upper pocket;

folding a rear flap towards the roof, whereby the rear flap is integrally joined with the rear panel;

magnetically attaching the rear flap to the plurality of metallic tensioned hooks at the roof support structure;

folding a pair of lateral flaps towards the rear panel, whereby the lateral flaps are integrally joined with the side flaps, whereby the lateral flaps comprises lateral fasteners; and attaching the lateral fasteners of the lateral flaps to corresponding fasteners at or near the rear panel.

* * * * *